United States Patent [19]

Newman

[11] Patent Number: 4,573,927

[45] Date of Patent: Mar. 4, 1986

[54] MEANS AND METHOD OF SHOWING FEELINGS

[76] Inventor: Patricia T. Newman, 315 Shepard St., Raleigh, N.C. 27607

[21] Appl. No.: 645,235

[22] Filed: Aug. 29, 1984

[51] Int. Cl.$^4$ .......................... G09B 19/00; A63H 3/00
[52] U.S. Cl. ....................................... 434/236; 446/321
[58] Field of Search ................. 434/236, 94, 365, 371, 434/396, 408, 433; 446/321, 337, 338, 339, 340, 372, 100

[56] References Cited

U.S. PATENT DOCUMENTS

| | | | |
|---|---|---|---|
| 1,059,178 | 4/1913 | Lombra | 446/321 |
| 1,926,139 | 9/1933 | Browne | 434/365 |
| 2,199,049 | 4/1940 | Greenberg | 434/100 |
| 3,729,865 | 5/1973 | Naunheim | 434/371 X |
| 3,783,553 | 1/1974 | Goozner | 446/372 |
| 3,811,220 | 5/1974 | Glass et al. | 446/321 |
| 4,122,628 | 10/1978 | Crowell et al. | 446/100 |
| 4,341,521 | 7/1982 | Solomon | 434/236 |

Primary Examiner—William H. Grieb
Attorney, Agent, or Firm—Mills and Coats

[57] ABSTRACT

This invention is a means to aide children in identifying, accepting and expressing their feelings. This means is in the form of a doll like figure which is used adjunctively in therapeutic and child care setting as well as in natural surroundings. The doll like figure associated with the present invention is so designed that its faces can be changed according to the feelings to be exemplified.

9 Claims, 10 Drawing Figures

MEANS AND METHOD OF SHOWING FEELINGS

BACKGROUND OF INVENTION

In therapeutic settings working with children who are experiencing emotion and/or learning problems, such children quite often have a great deal of difficulty in being able to identify, express, and accept their feelings. In addition to the above, almost all children have particular difficulty in expressing and dealing with negative thoughts and feelings which they often equate with being "bad". This mistaken viewpoint that it is wrong to show feelings such as anger can thwart a child's development of a healthy, positive self image.

Although children are told that there is nothing wrong in expressing their thoughts, and particularly negative thoughts, it is still difficult for them to accept this fact which, of course, can be very frustrating to both the child and the adult or adults involved.

BRIEF DESCRIPTION OF INVENTION

After much research and study into the above mentioned problems, the present invention has been developed to make it possible for a child to illustrate the four commonly felt emotions without even having to talk if the child so desires. This provides the child with a concrete way of expressing a feeling which he or she may or may not be able to readily verbalize or even verbalize at all.

The above is accomplished by providing four faces on a doll like figure which the child can readily change. Three of the four facial panels depict the negative emotions of anger, sadness and fear. The fourth panel depicts happiness. Thus a child using the means of the present invention is afforded a nonthreatening means of either identifying with or displaying observed feelings without feeling guilty for being "bad".

From the above it can be seen that the doll-like means of the present invention helps teach children to deal with conflicts and aides in the development of healthy attitudes towards their emotions in a playful, creative and instructive manner.

In view of the above, it is an object of the present invention to provide a doll-like means for teaching children to express commonly felt emotions without feeling guilty relative thereto.

Another object of the present invention is to provide a means for teaching children to deal with emotional conflicts in a playful, creative and instructive manner.

Another object of the present invention is to provide a non-threatening means for identifying and displaying emotional feelings, in particular negative emotion feelings.

Another object of the present invention is to provide a concrete way of allowing a child to express a feeling or feelings which he or she may be unable to verbalize.

Another object of the present invention is to provide a doll-like figure for aiding in emotional therapy, particularly emotional therapy in helping children to identify, express and accept their feelings.

Other objects and advantages of the present invention will become apparent and obvious from a study of the following description and the accompanying drawings which are merely illustrative of such invention.

DETAILED DESCRIPTION OF INVENTION

Figure 1:
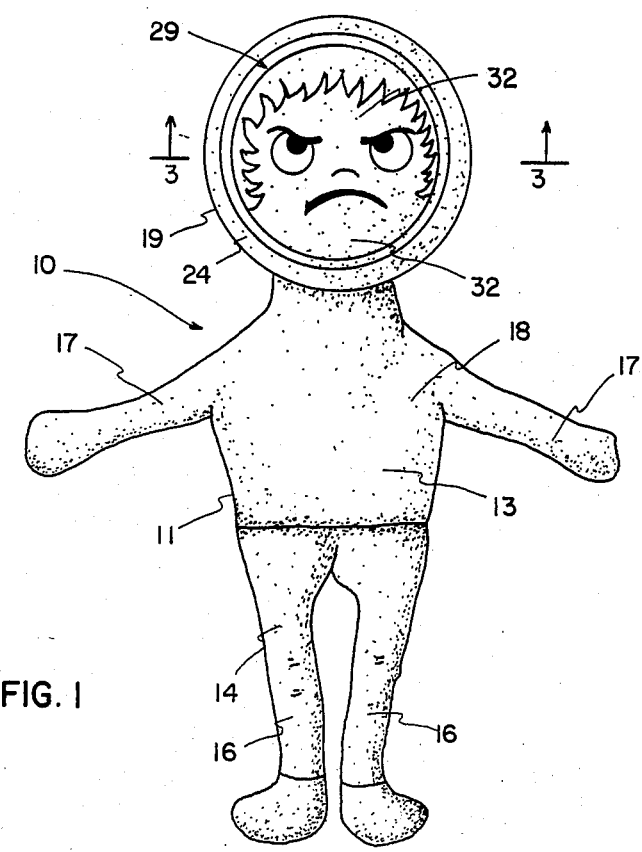
FIG. 1 is a front elevational view of the boy doll like figure used in conjunction with the present invention.
Figure 2:
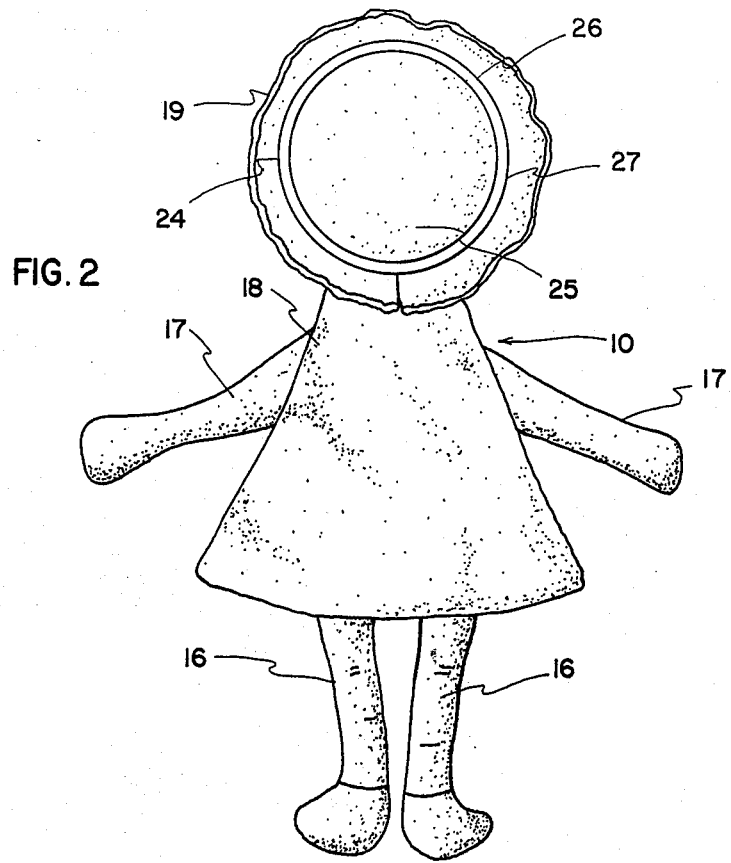
FIG. 2 is a front elevational view of the girl doll like figure used in conjunction with the present invention.

With further reference to the drawings, the doll like figure portion of the present invention, indicated generally at 10, is in a male form 11 as illustrated in FIG. 1 and is in a female form 12 as shown in FIG. 2.

The male form 11 includes a lower portion resembling pants as indicated at 14 and an upper portion resembling a shirt shown at 13.

The female form 12 includes a wrap around pinfore as indicated at 15 which can be secured by any convenient means such as Velcro, snaps, buttons or the like (not shown). Additionally the female form includes lace around the face opening which will hereinafter be described in greater detail.

The purpose of separate male and female forms is that little boys don't like to play with girl dolls and little girls don't usually like to play with boy dolls. This is particularly true in use of the present invention where the child does not need the distraction and humiliation of using a doll of the opposite sex to manifest the child's feelings. In other words, if the doll is of the same sex as the child then the child will not think of it as a doll but as an extension of its own personality but, as mentioned above, boys don't want to think of themselves as girls and girls don't think of themselves as boys, thus the two genders.

Figure 10:
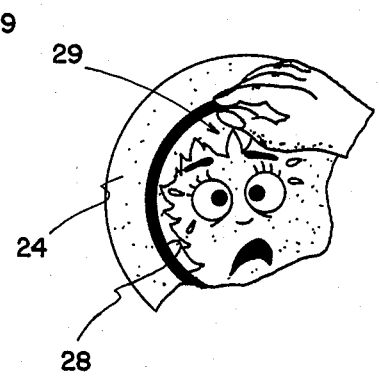

Beyond the male/female exterior appearance, each of the doll like figures 10 are basically the same with each having legs 16, arms 17, and body 18, and a head 19. All of these various parts of each of the doll-like figures are stuffed in the rag doll manner with either a fiberous material or a non-allergenic material such a foam rubber. This interior stuffing 20 is shown in the sectional view illustrated in FIG. 3.

Figure 3:
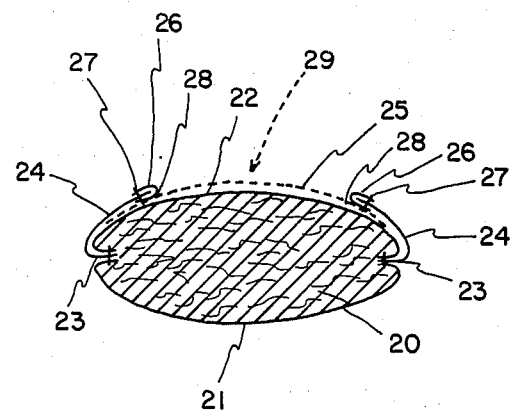
FIG. 3 is a sectional view taken through lines 3—3 of FIG. 1.
Figure 4:
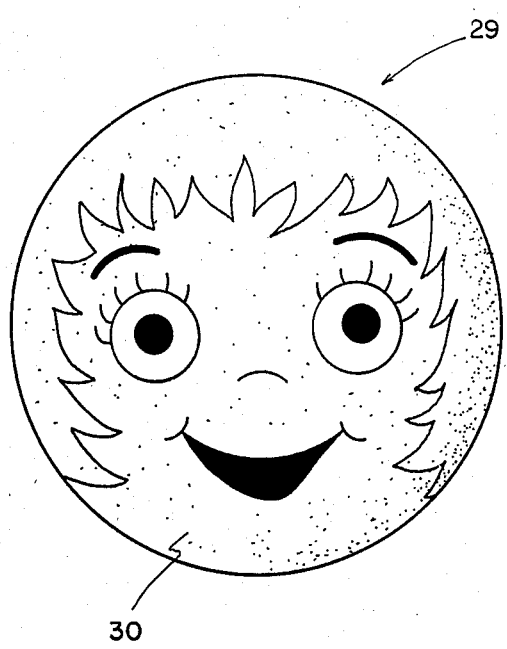
FIG. 4 is an elevational view of a happy facial panel.

Referring further to FIG. 3, a rear panel 21 and a front panel 22 are joined by seam stitching 23 with the face hood 24 being disposed therebetween. This latter mentioned hood forms a circular opening 25 with piping or similar material 26 being stitched as indicated at 27 about the periphery thereof.

Figure 8:
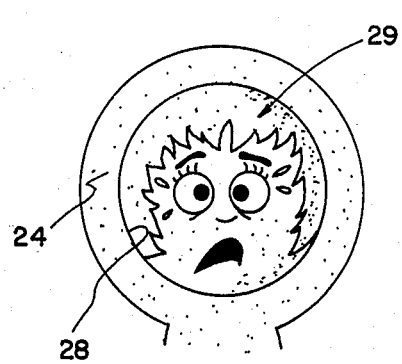
FIGS. 8, 9 and 10 illustrate the manner of insertion and removal of the facial panels used in cooperation with the doll-like figure.
Figure 9:
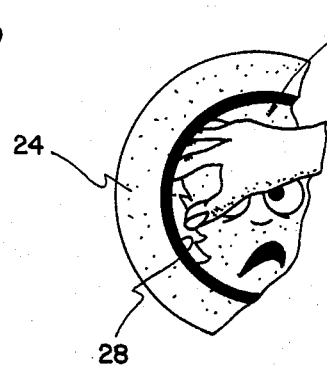

The area or pocket formed between the face hood 24 and the front panel 22, as seen clearly in FIG. 3, is adapted to have the edges of the desired facial panel, indicated generally at 29, tucked therein as shown in dotted lines in FIG. 3 and as will hereinafter be described for FIGS. 8, 9 and 10.

Figure 5:
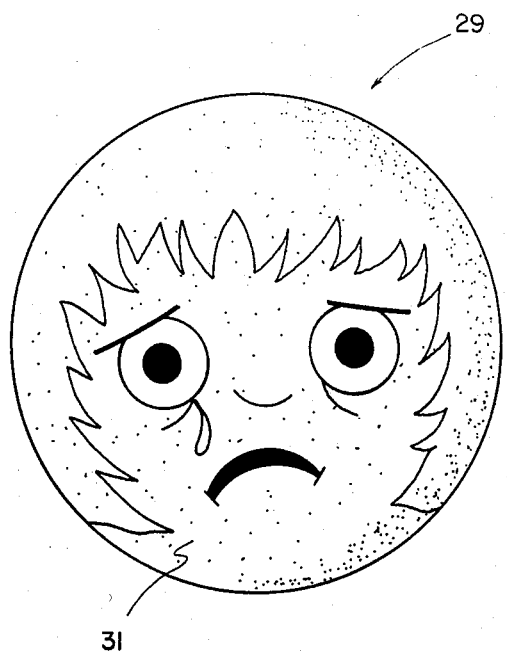
FIG. 5 is an elevational view of a sad facial panel.
Figure 6:
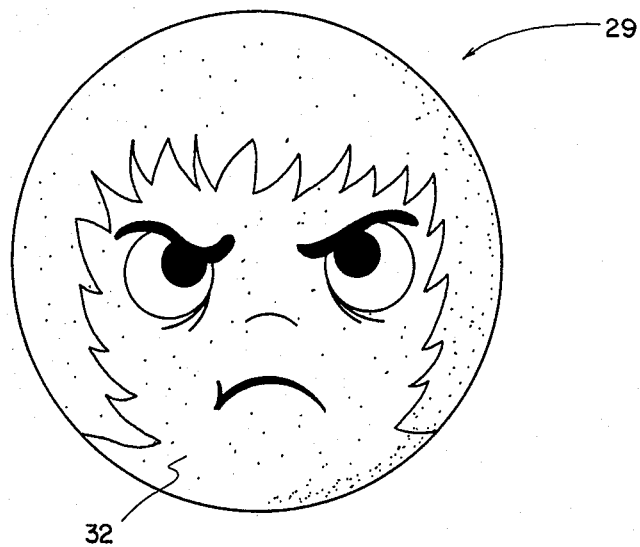
FIG. 6 is an elevational view of an angry facial panel.
Figure 7:
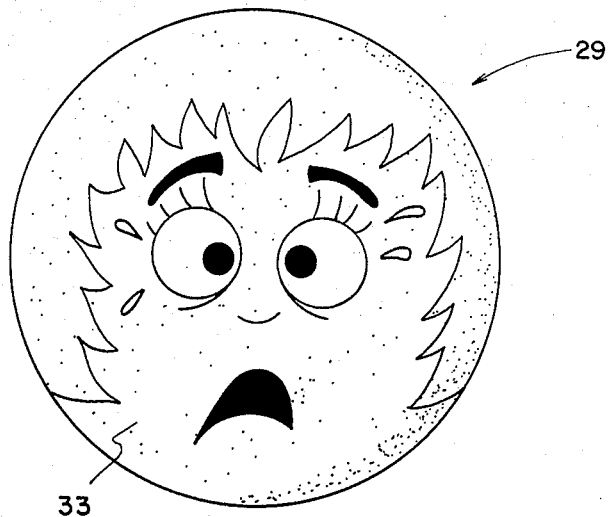
FIG. 7 is an elevational view of a fearful facial panel.

Referring specifically to the facial panels shown in FIGS. 4 through 7, FIG. 4 shows a happy face indicated at 30, FIG. 5 shows a sad face indicated at 31, FIG. 6 shows an angry face indicated at 32, and FIG. 7 shows a scared or fearful face indicated at 33.

Each of the above face forms are printed on separate facial panels and can be readily inserted under the face hood 24 to make the doll-like figure convey the particular feeling shown on such face panel. These face panels can be as readily removed as inserted by pulling the edge thereof from under the hood and replaced it with a different feelings face. This insert and removal process is illustrated in FIGS. 7 through 10.

Having now described the structural portion of the present invention, its method of use is set forth as follows:

The appropriate doll gender is selected for the child being worked with. Next the child is given the facial panels depicting the four commonly felt emotions of happiness, sadness, anger and fear. This child is shown how to tuck the facial panels 29 under the face hood 24 of their doll-like figure. It is then suggested to the child that accepting their feelings are natural and normal and they can express themselves by placing the facial panel corresponding to their feeling on the doll.

Once a child learns to express his or her feelings by the changing facial panels, the child benefits from knowing that adults understand and care and it allows the child to express himself or herself even when he or she does not wish to verbalize on the subject.

The feelings doll, as it is referred to by Applicant, has successfully been used to describe feelings associated with everyday situations such as bedtime fear of darkness, illness, trips to the doctor, disagreements and conflicts with siblings, contemporaries and adults, feelings about school, jealousy and feelings of being left out, duties and chores, disappointments, failures, making friends, and the like.

Also in everyday situations, the feelings doll of the present invention can be an invaluable aid in helping children deal with life crisis and events such as separations, divorce, death, moving, serious illness, etc.

In addition to children using the feeling doll of the present invention, adults can engage in using the same with the child as an incentive toward changing undesirable behavior such as placing the happy face on the doll in response to a dry bed in the morning, completion of chores, coming home on time, a good report card, sharing with others, and the like.

From the above it can be seen that the present invention provides a method of allowing children to accept and express their feelings without feeling ashamed or guilty. The method of accomplishing this is relatively simple both in structure and procedure and yet is highly efficient in preventing negative feelings and allowing the show of happy feelings, all with or without associated verbalization.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. The method of teaching a child to accept and express emotional feelings comprising: giving said child a doll-like figure; giving said child at least four separate and removable facial panels, each depicting one of the commonly felt emotions of happiness, sadness, anger and fear; instructing said child to illustrate his/her feelings by attaching an appropriate facial panel to said doll corresponding to his/her feelings whereby a child is provided with a non-threatening means of expressing his/her feelings.

2. The method of claim 1 wherein said changeable face doll like figure includes a normally blank, generally circular face with a hood like means extending circumventially thereabout whereby when a selected facial panel is tucked under said hood, said doll like figure conveys a specific feeling.

3. The method of claim 1 including attaching an appropriate face to said doll to illustrate for said child the feelings of the parent; and discussing with said child the feelings of said parent.

4. A teaching aid specifically designed to help children in accepting and expressing their feelings comprising: a doll-like figure having a generally circular face area; a circular hood means permanently attached to said figure and extending circumferentially about said face area to define a generally circular opening adjacent such face; and a plurality of separate and removable round fabric like panels with facial expressions thereon depicting commonly felt emotions whereby the user of the teaching aid can select the desired facial expressions and by placing it over the circular face area and tucking the edges thereof under the circumferential hood, a desired specific feeling can be illustrated.

5. The teaching aid of claim 4 wherein at least one of the facial panel depicts the commonly felt emotion of happiness.

6. The teaching aid of claim 4 wherein at least one of the facial panels depicts the commonly felt emotion of sadness.

7. The teaching aid of claim 4 wherein at least one of the facial panels depicts the commonly felt emotion of anger.

8. The teaching aid of claim 4 wherein at least one of the facial panels depicts the commonly felt emotion of fear.

9. The teaching aid of claim 4 including at least four facial panels, one depicting each of the four commonly felt emotions of happiness, sadness, anger and fear.

* * * * *